United States Patent [19]
Aggarwal

[11] Patent Number: 5,070,655
[45] Date of Patent: Dec. 10, 1991

[54] MACHINING PROCESS MONITOR

[76] Inventor: Trilok R. Aggarwal, 730 Nordyke Rd., Cincinnati, Ohio 45255

[21] Appl. No.: 621,060

[22] Filed: Nov. 30, 1990

[51] Int. Cl.$^5$ .............................................. B24B 49/00
[52] U.S. Cl. ............................. 51/165.71; 51/165.74; 51/165.76; 51/165.87; 364/474.06; 364/474.15
[58] Field of Search ........... 51/165.71, 165.72, 165.74, 51/165.76, 165.77, 165.87, 168; 364/474.15, 474.17, 474.19, 153, 184, 474.06

[56] References Cited

U.S. PATENT DOCUMENTS

| | | | |
|---|---|---|---|
| 3,829,750 | 8/1974 | Centner et al. | 51/165.77 |
| 3,967,515 | 7/1976 | Nachtigal | 82/2 B |
| 4,053,289 | 10/1977 | Tatsumi | 51/165.77 |
| 4,295,301 | 10/1981 | Barth et al. | 51/165.88 |
| 4,351,029 | 9/1982 | Maxey et al. | 51/165.87 |
| 4,359,841 | 11/1982 | Barth et al. | 51/325 |
| 4,558,686 | 12/1985 | Ono | 51/165.87 |
| 4,604,834 | 8/1986 | Thompson | 51/165.71 |
| 4,748,554 | 5/1988 | Gebayer et al. | 364/474.15 |
| 4,905,419 | 3/1990 | Makarov et al. | 51/169 |

FOREIGN PATENT DOCUMENTS 263489  1/1989  Fed. Rep. of Germany ... 51/165.87

OTHER PUBLICATIONS

Society of Manufacturing Engineers–Papers MS84–914, Kenneth W. Yee, "On the Use of Drill-Up for On-Line Determination of Drill Wear", 1984.
MR88–614, T. Raj Aggarwal, "Unattended Precision Grinding Process Development", 1988.
Commercial Brochures, WIBRA, "How to Detect Production Disturbances Before They Appear".
Windatronic, "Tool Monitoring Systems for Collision, Breakage and Wear".
Digital Techniques, "Maximize Your Tool and Machine Protection and Avoid Costly Part Scrappage . . . ".
Kennametal, "Kennametal TCS . . . State-of-the-Art Tool Sensing for Lathes".
Kennametal, "Rotating Tool Monitor Breakage System".
Promess, "Tool Condition Monitoring".
ATAM System, "ATAM System-Monitors Tool Wear, Breakage and Collision in Your Manufacturing Process for Improved Quality".

Primary Examiner—M. Rachuba
Attorney, Agent, or Firm—Steven J. Rosen

[57] ABSTRACT

A machine tool monitor having a machine power sensor and a machine vibration sensor transmitting respective vibration and power signals to a controller which process the signals and monitors the machines operation to detect a change in the machine's processing parameters solely as a function of the power and vibration signals. The monitor indicates whether the condition of the tool and its associated machining operation warrants scrutiny or should be stopped for service. Besides visual and audible alarm signals the machining condition monitor can be integrated with an automatic control such as an NC controller or PC.

In one embodiment a grinding machine monitor is provided with a power sensor and vibration sensor wherein the controller is adjusted to signal conditions associated with wheel sharpness, loss of coolant, and excessive vibrations.

7 Claims, 5 Drawing Sheets

SENSOR SIGNAL PROCESSOR
LOGIC CIRCUIT

FUNCTIONAL LOGIC CIRCUIT

MACHINING PROCESS MONITOR

BACKGROUND OF THE INVENTION

1. Field of the Invention

This invention relates to an apparatus and method for automatically monitoring machining processes and particularly, for monitoring a machining processes, as a function of the machine's mechanical vibration and power consumption.

2. Description of Related Art

Tool wear, loss of coolant, broken tools, and excessive vibrations are problems of machining apparatus and processes that use tools to grind, cut, drill, or in some way mechanically remove metal or other material during the machining process. These problems can cause reduced or unacceptable levels of quality, excessive scrap rates and increased production costs. During the grinding process dull tools, such as grinding wheels, or loss of machine coolant may easily go undetected by the machine operator and lead to sometimes expensive machinings having to be reground or scrapped altogether. The use of automated machining devices including robots, machining cells, and other unattended machines requires some means of machining process monitoring whether it be manual or automated. Several automated tool monitoring devices have been developed to monitor tool wear. These tool monitors produce signals that warn human operators to take corrective action or send signals to computerized machine controllers which then initiate automated corrective procedures.

Prior tool monitoring devices use complicated and expensive probes that may require modification of the grinding machines or machining process. One such device is described in U.S. Pat. No. 4,295,301 entitled "Dressing Apparatus with Means for Detecting Grinding Wheel Wear", by Barth et al. and has a complex movable intrusive probe which must contact the grinding wheel and a probe movement detection device as well as an accelerometer.

Acoustic energy sensor based tool monitoring systems have also been found to require frequent calibrations as well as requiring more complicated less accurate apparatus than that of the present invention.

Other tool wear or condition monitors are known and used in the industry such as the ATAM system by IRD Mechanalysis which uses an accelerometer to produce a signal indicating vibrational patterns of machines which change as the cutting tool wears which requires a great deal of calibration each time a new tool is used.

The WIBRA tool condition monitoring system produced by the WIBRA Company of Sweden, as described in their brochures which are incorporated herein by reference, uses only accelerometer data and requires that the system be recalibrated each time a new tool is used. It also is most accurate when the tool is damaged unlike the present invention which seeks to prevent production of a machining with less than minimum quality levels.

SUMMARY OF THE INVENTION

The present invention provides a machining process monitor and method to monitor the machining process as a function of mechanical vibration levels and machine power consumption. The present invention includes a mechanical vibration sensing means and a power sensing means to produce respective input signals which are processed by a signal processor and electronic computation means to produce an output a machining process condition signal. In the preferred embodiment the monitor is calibrated to produce a condition signal indicative of tool sharpness, excessive vibration, and loss of coolant as a function of the machines power consumption and mechanical vibrational levels as measured by the power and vibration sensing means respectively. The preferred embodiment of the present invention is illustrated in the form of a grinding wheel monitor but alternative embodiments contemplate other machining monitors which employ other material removal tools. The present invention includes an accelerometer mounted on the machine for a means to measure vibration. The present invention further contemplates the use of analog and digital signal processing and electronic computation means.

ADVANTAGES

The present invention provides a versatile non machine specific means for the detection of changing machining process parameters that affect product quality on any machining apparatus and is used to produce high quality parts. The illustrative example of the preferred embodiment of the invention provides that grinding process parameters taken into account include grinding wheel sharpness, vibrations, specific energy and coolant levels being used in the grinding process. The present invention may be used on various types of grinding machines such as cylindrical grinders, centerless grinders, surface grinders, creep feed grinders, tool grinders, etc.

The present invention provides a means to detect the grinding wheel sharpness condition, a sudden loss of coolant, and excessive vibrations between the grinding wheel and the work piece during machining. The invention also takes into account machine operating parameters for the purpose of maximizing productivity and/or minimizing operating costs. The parameters provided for include wheel speeds, feeds, depth of grind, spark out, dressing cycle, and wheel hardness.

BRIEF DESCRIPTION OF THE DRAWINGS

The foregoing aspects and other features of the invention are explained in the following description, taken in connection with the accompanying drawings where.

DETAILED DESCRIPTION OF THE INVENTION

Figure 1:
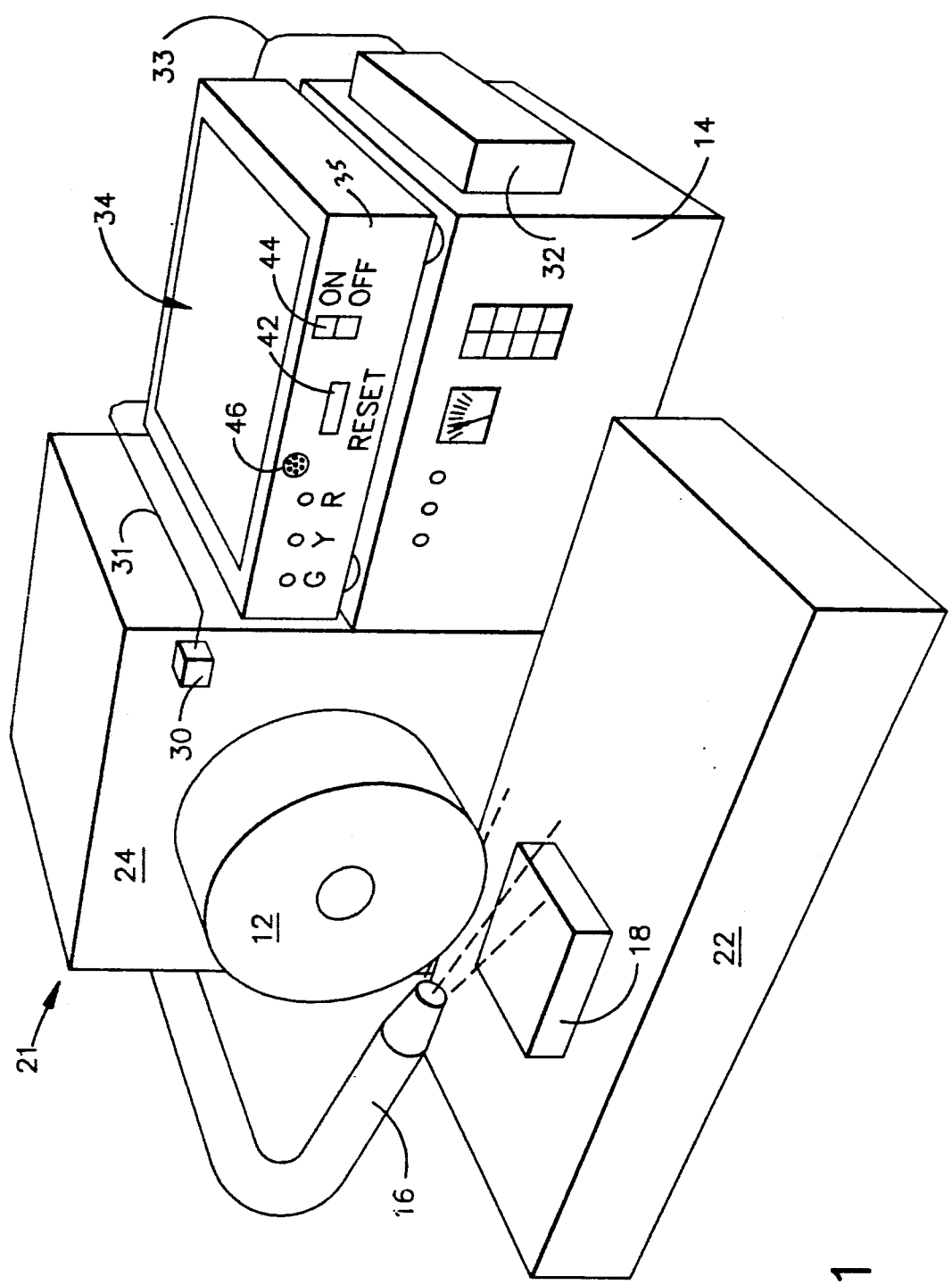
FIG. 1 is a diagrammatic illustration of a typical grinding machine employing a grinding wheel condition monitor in accordance with the present invention.

Referring to FIG. 1, the preferred embodiment of the present invention is illustrated as a means for monitoring the grinding process of grinding machine 21. The means for monitoring the grinding process includes a monitor 34 which is connected via line 31 to a mechanical vibration sensing means illustrated as a conventional accelerometer 30 operable to send a mechanical vibration signal and a conventional power sensing means 32, such as the "Power Cell" available from Load Controls Incorporated, operable to send a power level signal via line 33 to monitor 34. Grinding wheel monitor 34 is depicted as monitoring a conventional grinding machine 21, which may be a Numerically Controlled (NC) machine, having a grinding wheel 12 powered by a motor (not shown) under the spindle bearing cover 24 and controlled by a machine controller 14 and a table 22 operable for mounting workpiece 18. Also shown is a grinding coolant applicator 16.

Accelerometer 30 provides a vibration sensing means and, though shown attached to a spindle bearing housing 24, may be placed at another more advantageous position on the grinding machine. A general rule is to place the accelerometer as close to the rotating tool as possible. Power sensing means 32 may be attached and connected to a machine controller 14 and provides a means for detecting power consumption by the machining process of machine 21 and producing a signal indicative of that level of power. The power consumption measured in the case of a grinding wheel machining process is the amount of electrical power delivered to the motor turning the grinding wheel is measured. Contained within monitor 34 is a computing means, shown in FIGS. 5A and 5B, which monitors the signals from accelerometer 30 and power signal sensing means 32 and provides an condition signal having at least one output in the form of an array of green, yellow, and red warning lights respectively labeled G, Y, and R on a front panel 35 of monitor 34 and an audible alarm 46 to supplement red warning light R.

Figure 4:
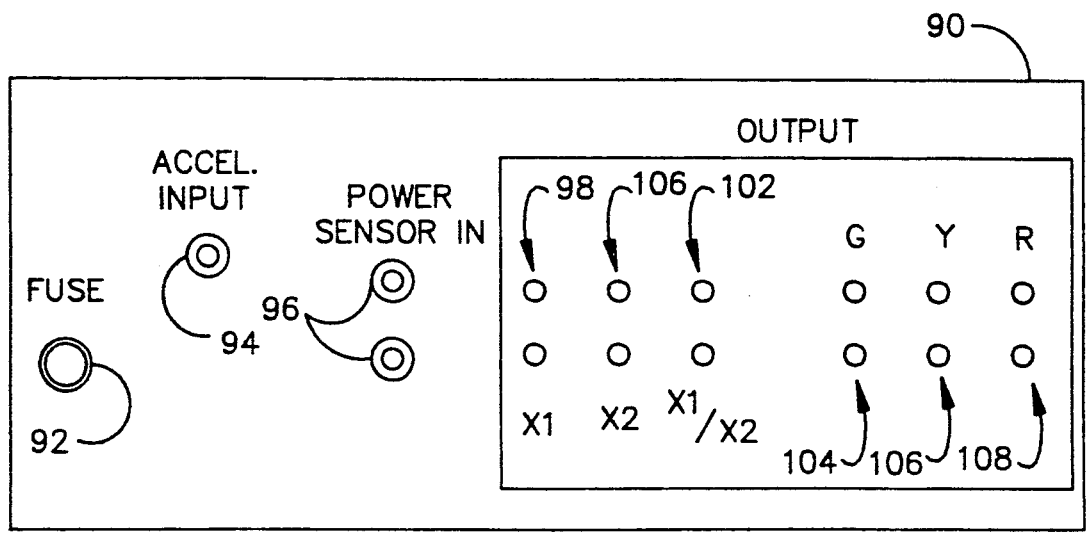
FIG. 4 is a diagrammatic illustration of the output panel located on the rear side of the grinding wheel condition monitor of FIG. 1 in accordance with the present invention.

The preferred embodiment also provides means for outputing these condition signals via jacks on a back panel 90 of monitor 34 as depicted in FIG. 4. Condition signal lights G, Y, and R on front panel 35 correspond to jacks 104, 106, and 108 respectively. Back panel 90 also provides a mounting means for a fuse 92 and vibration and power sensor inputs 94 and 96 respectively. This provides a means for connecting the monitor to a computer or other automated system which can be used to control the machining operation or process.

Figure 2:
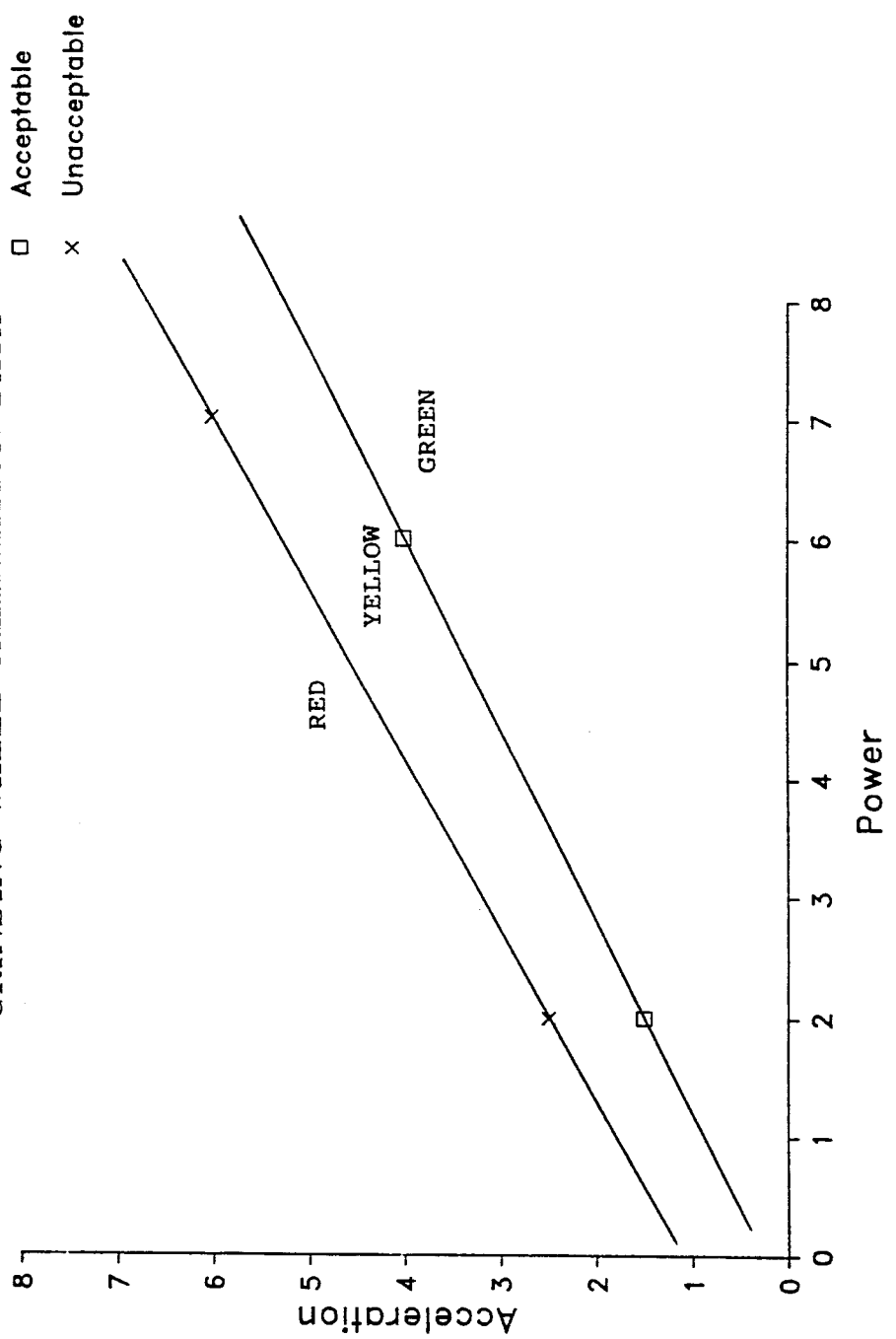
FIG. 2 is a graphic illustration of calibration measurements and related functions calculated by the computing means of the grinding wheel condition monitor of FIG. 1 in accordance with the present invention.

Referring to FIG. 2, the present inventions provides an apparatus and means for monitoring the operating condition of a machining process and tool such as a grinding process and wheel as depicted in the illustrative embodiment described herein. A computing means, described in more detail later herein, located within monitor 34 monitors the machining process as a function of mechanical vibration and power consumption as measured by accelerometer 30 and power sensing means 32. The monitoring function, graphically depicted in FIG. 2, is preferably broken up into three zones RED, YELLOW, and GREEN, as indicated, as a function of vibrations indicated by the Y axis and power as indicated by the X axis. The red line having a slope R2 and a Y intercept R1 and the green line having a slope G2 and a Y intercept G1 defines the three operating regions shown in the graph, wherein Green represents good or acceptable operating conditions, Yellow indicates cautionary conditions wherein some degree of scrutiny or attention is required, and Red indicates a poor or unacceptable machining process condition that requires the machine be stopped because it is operating outside of acceptable boundaries of performance such as a dull tool, grinding wheel 12 in the illustrative embodiment, or something is wrong with the machine such as a broken tool or loss of coolant.

Figure 3:
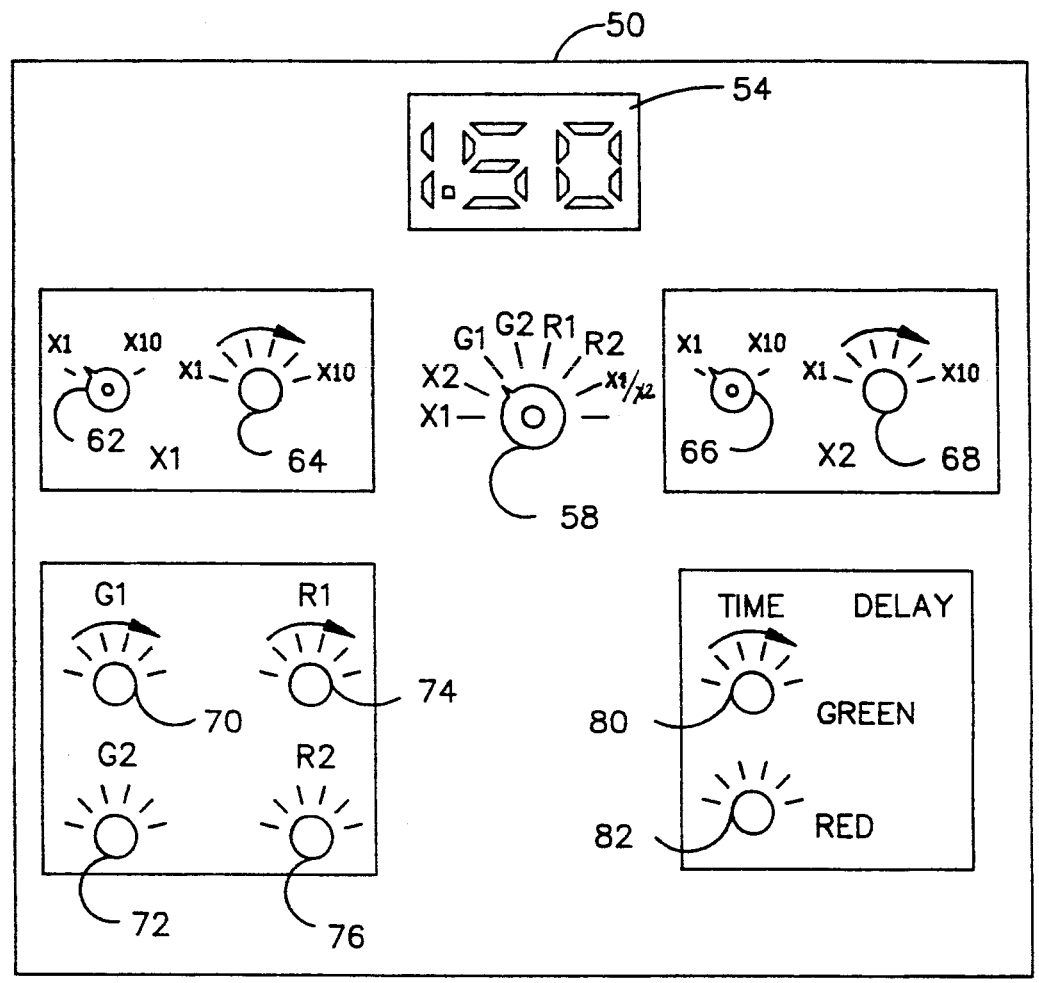
FIG. 3 is an illustration of the calibration control panel located within the grinding wheel condition monitor of FIG. 1 in accordance with the present invention.

The embodiment illustrated herein incorporates an analog solid state system but a digital system is also acceptable and for some applications may be more desirable. The computing means is illustrated in FIG. 3 by way of a calibration control panel 50 used to calibrate monitor 34 and a circuitry flow chart in FIGS. 5a and 5b which illustrates the means of processing the input signals from vibration sensor 30 and power sensor 32.

Figure 5A:
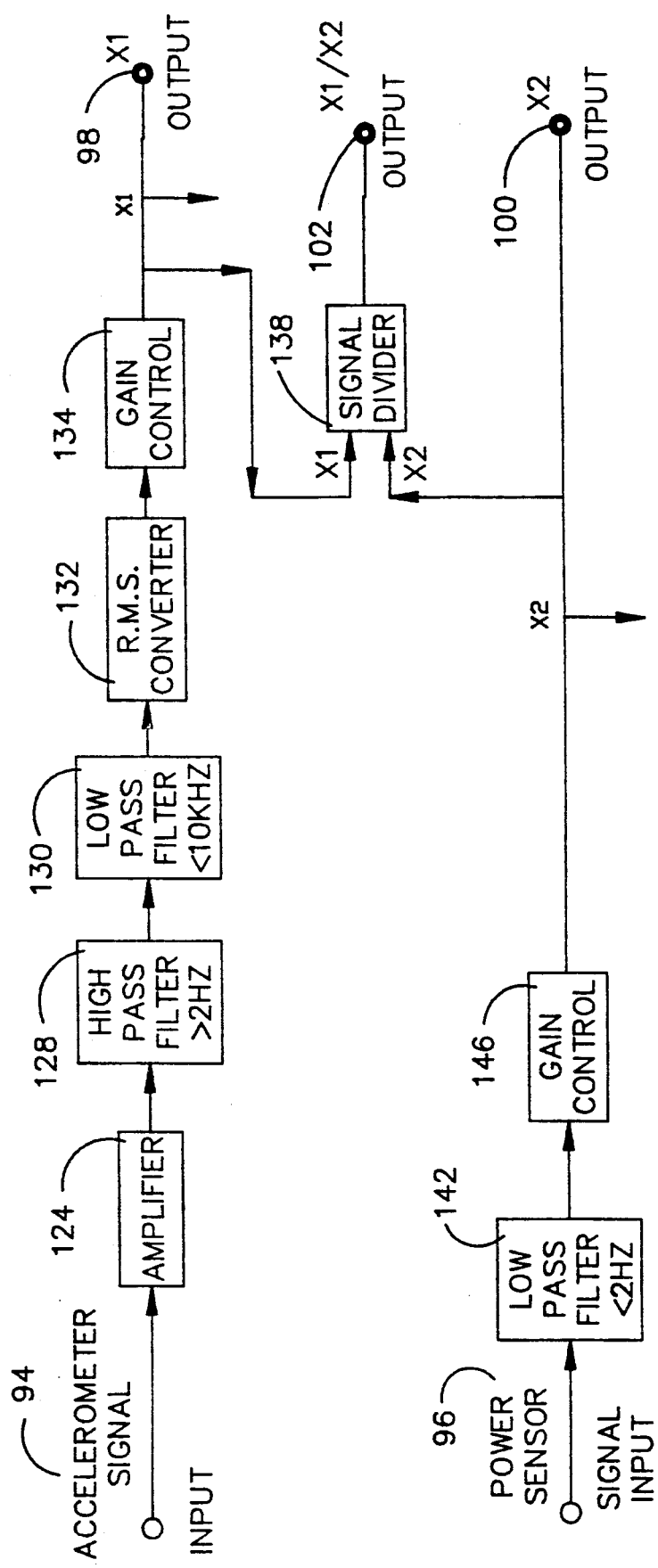
FIG. 5a is a schematic flow diagram illustrating the signal processing portion of the control system for the grinding wheel condition monitor in accordance with the present invention.
Figure 5B:
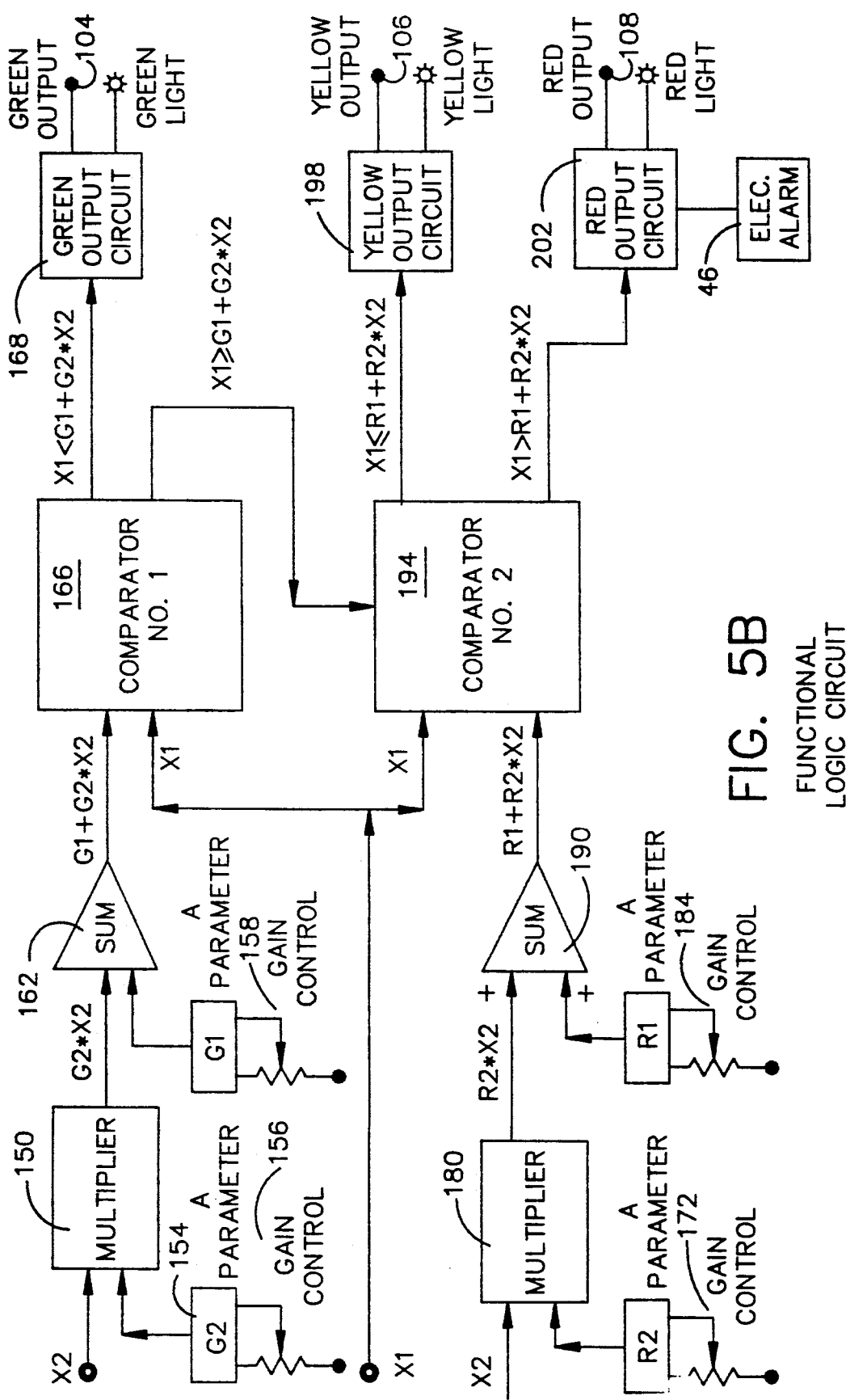
FIG. 5b is a schematic flow diagram illustrating the control logic portion of the control system for the grinding wheel condition monitor in accordance with the present invention.

The calibration means of monitor 34 is basically illustrated on calibration panel 50 and includes position step gain and variable gain switches to adjust signal gain for the computing circuitry illustrated in FIGS. 5a and 5b. The various gain switches for X1, X2, G1, G2, R1, R2 and X1/X2 are depicted on the control panel 50 in FIG. 3. Furthermore, time delay is built into the yellow light circuit and the red light circuit in order to prevent transient signals from prematurely setting off the red or green warning light. The switches have a zero to ten second delay and wherein a one second delay is preferred and has been found sufficient for the grinding wheel embodiment of the present invention. A multi-positioned switch 58 multiplexes the various parameter circuits which must be calibrated by adjusting their gain to a digital voltmeter 54. Voltmeter 54 is a digital type which is used to set the gain on various circuits X1, X2, G1, R1, G2 and R2 of the illustrated embodiment. Note that the gain for X1 and X2 incorporates two gain switches, step gain switches 62 and 66 respectively (two position switches having first and second positions equal to x1 and x10 respectively) and fine gain switches (pots) 64 and 68 respectively having a range of 1 to 10. Adjustments for G1, G2, R1, and R2 only require fine gain and incorporate similar types of fine gain switches 70, 72, 74, and 76 respectively.

Having thus described the calibration means, the calibration of monitor 34 will be described. Starting with a freshly dressed grinding wheel 12, a workpiece 18 is mounted on table 22. Grinding wheel 12 is then sharpened by dressing it up and a light first power cut is taken through workpiece 18 with the multiplexor switch 58 set to the X1/X2 position. During this cut, the X1 set of gain control switches 62 and 64 are adjusted so that the reading on volt meter 54 is point eight zero (0.80). Having thus set the gain on X1/X2 the same light grinding pass with the sharpened grinding wheel 18 is made but wherein the multiplexing switch 58 is set first to X1 and then to X2 and the values for the X1 and X2 are noted as $X1_L$ and $X2_L$ respectively. The process is repeated for relatively for heavier horse power cut wherein the values are noted for $X1_H$ and $X2_H$ which refer to the setting of multiplexor switch 58 to X1 and X2 respectively for a high horse power cut. Note that the low horse power and high horse power cuts refer to a light and heavy or deep cut respectively.

Parameters R1, R2, G1, and G2 are calculated from the following functional formulas or relationships.

$$DELTA_{X1} = X1_H - X1_L$$

$$DELTA_{X2} = X2_H - X2_L$$

$$C = X1_L - X2_L * (DELTA_{X1}/DELTA_{X2})$$

$$G2 = 1.2 * (DELTA_{X1}/DELTA_{X2})$$

$$G1 = 1.2 * C$$

$$R1 = 1.68 * C$$

$$R2 = 1.68 * (DELTA_{X1}/DELTA_{X2})$$

Having thus calculated the above parameters, the calibration continues by sequentially setting the multiplexor switch 58 to G1, G2, R1 and R2 settings respectively and adjusting the gain for each selection to their respective parametric values previously calculated using gain switches 70, 72, 74 and 76 on calibration panel 50 as shown in FIG. 3. With the gain thus set for the calculated parametric values, green and red signal time delay switches 80 and 82 respectively on calibration panel 50 must be set. Time delay switches 80 and 82 are provided with a time delay ranging from 0 to 10 seconds wherein for the grinding wheel embodiment a one second delay is preferred.

The construction and operation of the preferred embodiment of the computing means may be best understood by referring to FIGS. 5a and 5b.

Referring to FIGS. 5a and 5b, circuitry for invention's computing means is illustrated by way of a flow chart describing the elements and operation of the computing means. Accelerometer signal 94 is input from accelerometer 30 by way of line accelerometer signal line 31 (shown in FIG. 1) into accelerometer amplifier 124 from where it is sent through a first high pass filter 128 and a first low pass filter 130 to filter out noise. Accelerometer signal 94 is subsequently converted to an absolute value by RMS (root means square) converter 132. The RMS accelerometer signal is adjusted by a vibration signal gain control 134 and output as signal X1 to both a signal divider 138 and to an X1 output jack 98 located on back panel 90 as illustrated in FIG. 4.

Power signal 96 is generally of a greater voltage than accelerometer signal 94 and is received from power sensor 32 in a partially conditioned form therefore, in the case of the preferred embodiment, it is sent to a second low pass filter 142 to filter out noise and then a power signal gain control 146 and output as signal X2 to both signal divider 138 and to an X2 output jack 106 located on back panel 90 in FIG. 4. Signal X1/X2 is calculated by signal divider 138 and output to output jack X1/X2 jack 102 on back panel 90 in FIG. 4.

Signals X1, X2, and X1/X2 are also output to voltmeter 54 via multi-position rotary switch 58 in FIG. 3 for adjustment of gain control for the calibration operation as described previously herein.

Referring to FIG. 5b, a schematic of the functional logic circuit of the preferred embodiment is illustrated in flow chart format depicting the reception of a signal X2 from the sensor signal processor circuit of FIG. 5a by a first multiplier 150. Simultaneously parameter G2 signal is generated by taking a base signal 154, generated by a power supply (not shown) of monitor 34, and biased by a G2 gain control 156 whose calibration is described further on herein. Signals G1, R2, and R1 are generated in the same manner from base signal 154 and their respective gain controls 158, 172, and 184. Signals G2 and X2 are multiplied by a first multiplier 150 to produce a signal G2*X2 is then summed with signal G1 by a first summer 162. Summer 162 calculates the function G1+G2*X2 for use by a first comparator 166. First comparator 166 receives signal X1 and compares it to the function G1+G2*X2 and if it determines X1 is less than G1+G2*X2 then an activation signal is sent to green output circuit 168 which initiates a green output 104 and turns on the green signal light marked G on the front panel of monitor 34 in FIG. 1.

If comparator 166 determines that signal X1 is greater than or equal to G1+G2*X2 then a signal is sent to the second comparator 194 for later use in determining whether the yellow or red circuit should be initiated.

Still referring to FIG. 5b, signals X2 and parametric signal R2, generated from base signal 154 by an R2 gain control 172 in the same manner as parameters G2 and G1 were, multiplied by a second multiplier 180 to produce functional signal R2*X2 which is then sent to a second summer 190. Second summer 190 also receives a parametric signal R1, generated from base signal 154 by an R1 gain control 184. Second summer 190 calculates the functional signal R1+R2*X2. Second comparator 194 takes signal X1 and signal R1+R2*X2 and calculates whether X1 is less than or equal to R1+R2*X2. If second comparator 194 determines X1 is less than or equal to signal R1+R2*X2 an activating signal is sent to yellow output circuit 198 for initiating yellow output 106 and yellow light Y on the front panel of monitor 34. If X1 is found to be greater than R1+R2*X2 by second comparator 194 then red output circuit 202 activated and red output 108 is initiated as well as red light marked R on the front panel of monitor 34. An audible alarm is also initiated by red output circuit 202 which is marked 46 in both functional logic circuit of FIG. 5b and on the front panel of monitor 34. The present invention contemplates the use of non-linear functions which may include higher order equations such as to the power of 2 and 3 and more complicated computing means and calibration means. A digital computer such as one contained in a machine controller or a personal computer may be used.

While the preferred embodiment of our invention has been described fully in order to explain its principles, it is understood that various modifications or alterations may be made to the preferred embodiment without departing from the scope of the invention as set forth in the appended claims. For example it is contemplated that the present invention may also be used to monitor the tool conditions or sharpness in a variety of machining systems, particularly automated ones such as NC machines, such as turning machines, drills, lathes etc, wherein material removal processes such as drilling or turning are employed.

We claim:

1. A machining process monitor for monitoring a machine's operation, said monitor comprising:
    a vibration sensor for measuring mechanical vibrations of the machine during the machine's operation,
    a machine power sensor for measuring power consumption of the machining process by the machine during the machine's operation,
    a computing means for providing output signals indicative of the machines operating condition as a function of vibration directly related to power from vibration and power signals generated by said vibration and power sensors.

2. A machining process monitor as claimed in claim 1 wherein said output signals defines at least three operating zones, wherein said zones are an acceptable, a cautionary, and an unacceptable operating zones.

3. A machining process monitor as claimed in claim 2 wherein said computing means includes a calibration means for defining said zones.

4. A machining process monitor as claimed in claim 3 wherein said function is linear in nature.

5. A grinding process monitor for monitoring the operation of a grinding wheel machine having a grinding wheel, said grinding monitor comprising:

a vibration sensor for measuring mechanical vibrations of the machine during the machine's operation, a machine power sensor for measuring power consumption of the grinding wheel during the grinding wheel machine's operation, a computing means for providing output signals indicative of the machines operating condition as a function of vibration directly related to power from vibration and power signals generated by said vibration and power sensors.

6. A grinding monitor as claimed in claim 5 wherein said output signals defines at least three operating zones, wherein said zones are an acceptable, a cautionary, and an unacceptable operating zones.

7. A grinding monitor as claimed in claim 6 wherein said computing means includes a calibration means for defining said zones.

* * * * *